(12) United States Patent
Adler

(10) Patent No.: US 6,581,073 B1
(45) Date of Patent: *Jun. 17, 2003

(54) REMOTE AUTOMATED NOTICE SYSTEM

(76) Inventor: Robert M. Adler, 400 N. Flagler Dr., D-2, West Palm Beach, FL (US) 33401

( * ) Notice: Subject to any disclaimer, the term of this patent is extended or adjusted under 35 U.S.C. 154(b) by 229 days.

This patent is subject to a terminal disclaimer.

(21) Appl. No.: 09/697,826

(22) Filed: Oct. 26, 2000

Related U.S. Application Data

(63) Continuation of application No. 09/400,036, filed on Sep. 21, 1999, now Pat. No. 6,401,095.

(51) Int. Cl.$^7$ .............................................. G06F 17/30
(52) U.S. Cl. ........................................ 707/200; 707/10
(58) Field of Search ................................ 707/10, 104, 3, 707/6, 1, 200; 340/573.3; 374/67.1; 40/300; 342/357.07

(56) References Cited

U.S. PATENT DOCUMENTS 5,036,610 A * 8/1991 Fehr ............................ 283/70
5,878,116 A * 3/1999 Scott ...................... 379/201.09
6,067,018 A * 5/2000 Skelton et al. ............... 119/721
6,401,095 B1 * 6/2002 Adler .......................... 707/10

OTHER PUBLICATIONS

Sherlock Bones, www.sherlockbones.com pp. 1–7, 1997.*

* cited by examiner

Primary Examiner—Sanjiv Shah
(74) Attorney, Agent, or Firm—McHale & Slavin, P.A.

(57) ABSTRACT

The preset invention is a system that utilizes the global computer network (internet) to provide an intelligent and powerful notification system for canvassing specific geographical areas in a matter of seconds to aid in the location of a missing person or pet while traveling. Utilizing an on-line missing person or pet interview and active web site engine, a photo e-mail can be distributed instantaneously to reach a large segment of the area in which the person or pet is lost. The notification system retains information about a person or pet, including photographs, and their responsible adult or owner. Upon notification of the loss of a person or pet and the area lost, the system will initiate calculations, based upon the submitted area lost, particular abilities of the person or pet, and an estimate of how long the person or pet has been missing, to determine the most appropriate target area for the search.

7 Claims, 5 Drawing Sheets www.WebSite.com

RESCUE CENTER

Please enter the following information carefully, then click SUBMIT.

Please enter your name: First [ ] Middle [ ] Last [ ]

Home Phone [ ] [ ]

Please enter code of missing person: [ ]
OR
Please enter missing person's name: [ ]

Search is now underway!

1,780 Photo E-mails are now being mass distributed to:

16 Police/Fire Departments

37 Veterinarians

6 Humane Societies 1,832 Volunteer Pet Lovers

33 Television / Radio Stations

35 Churches • Synagogues • Temples

21 Schools

If you would like a hard copy of the names, addresses, phone numbers, and emails of where the photo E-mail was sent, Click here

Now click

REMOTE AUTOMATED NOTICE SYSTEM

RELATED APPLICATIONS

This application is a continuation-in-part of Ser. No. 09/400,036 filed Sep. 21, 1999, now U.S. Pat. No. 6,401,095, issued Jun. 4, 2002, herein incorporated by reference.

FIELD OF THE INVENTION

This invention relates generally to a geographically sensitive system for noticing lost persons or pets while traveling by use of a global computer network.

BACKGROUND OF THE INVENTION

The loss of one's personal property, whether by chance or as the result of theft, is often devastating. When the lost item is a living being, for example an elderly parent, a child or even a pet, the loss is catastrophic. While the loss of a child brings together numerous governmental agencies, e.g. police departments, the FBI, fire departments, etc., there is no instant means to coordinate the disseminate information. Further, if a pet is lost, there is no governmental agencies to call for help with locating the animal.

Should the person or pet be lost while away from home, for example, on vacation, immediately initiated searches are critical. The parents or owners may be hours or days away from home and their intended length of stay short. Additionally, a elderly person or a lost child may have difficulty communicating to strangers. A lost pet may also become disoriented and exposed to dangers not found at the pet owner's home.

Statistics pertaining to missing children states that there are 2,300 children reported missing every day in the United States. In the United States, there are 112 million dogs and cats of which an estimated 20% or 22.4 million will become lost each year. Greater than 50% of these will never be found alive.

For missing persons, the recovery rate is much greater than that of animals due to their ability to communicate and the higher intensity of the search. However, the anxiety due to a prolonged search can produce psychological scars to both the missing person and the responsible adult. Further, the recovery rate is not as high for abducted people and runaways where the cooperation of the subject is either prevented or not volunteered.

The options available to owners of lost pets are few; putting up posters, a search, often fruitless, by the pet owner, etc. Motor vehicles, euthanasia, predators, and starvation claim one of every two pets who never return home. Thus, what is lacking in the art is notification system capable of providing notice to a geographically sensitive area upon discovery of a lost person or pet from home or when away from home.

DESCRIPTION OF THE PRIOR ART

U.S. Pat. No. 5,878,116 is drawn to a method for locating a lost pet, person, or object. The method describes use of an identification number contained on a card held by the owner and on a tag attached to the item.

The prior art suffers from an inability to distribute an alert regarding the lost person or pet (1) in a timely fashion and (2) to an appropriate geographical area thus maximizing the probability of recovery.

A method for finding a lost person or pet while on vacation which would alert the appropriate personnel that a particular person or pet was missing in their location, at the instant the person or pet is determined lost, will satisfy a long felt need in the art.

SUMMARY OF THE INVENTION

The present inventor has developed a system which utilizes the technological power provided by the global computer network (internet) to provide an intelligent and powerful person or pet notification system for canvassing specific geographic area in a matter of seconds. By use of an on-line interview and active web site engine, an e-mail of the lost person or pet can be distributed instantaneously to reach a large segment in the area the person or pet is lost, including police agencies, TV, radio stations, veterinarians, humane societies, churches, doctors, and any applicable volunteer groups. This is especially critical when traveling for the person responsible for the child or pet has no ready means of determining who can assist them in this time of need.

The notification system has the capability of retaining information about the lost person or pet, including a photograph, and their responsible adults or owners. Present technology makes it possible to scale a single system to handle all lost person and pets. Upon notification that a person or pet is missing, the area lost, and other pertinent information, the system will instantly calculate the geographical location within which that person or pet is most likely to be. Using an entered zip code to indicate the area lost, the system will initiate calculations, based upon the particular age and ability of the person, or size of the pet, and an estimate of how long the person or pet has been missing, to determine the most appropriate target area for the search.

Utilizing high speed distribution of photo e-mails, at speeds of about 30,000 per minute; and high speed distribution of emergency phone calls, at speeds of about 10,000 per 15 minutes; the system will utilize the enormous popularity and communicating power of the global computer network to activate a proactive on-line technology. The system will instantly canvass large geographic areas in seconds, distributing vital information to strategically positioned members of the local community in order to reunite the missing person or pet with their responsible adults or owners. Thousand of caring people will be alerted within minutes of notification that a person or pet is lost, enabling the area in which the person or pet is lost to come together quickly and galvanize their efforts to locate the lost person or pet.

The present inventor contemplates the use of the system for finding missing people, child or adult, and pets both from home or if lost at a location other than home. Also, the system may be used for finding lost articles and possessions.

Accordingly, it is an objective of the instant invention to teach a notification system which utilizes the global computer network to initiate a notification process to help in locating a lost person, pet, or object wherever lost.

It is a further objective of the instant invention to provide a method of operating a person, pet, or object interview and active web site engine via the global computer network, which provides speed, scalability, reliability, and security.

It is yet another objective of the instant invention to teach a person, pet, or object notification system which provides for registration of the person, pet, or object online via inclusion of scanned photographs.

It is a still further objective of the invention to teach a system which determines an optimum exposure area for the distribution of information regarding the lost person or pet based upon input of critical data regarding the person's age and abilities, pet's age, species, and size, the time the person or pet was lost, and the person or pets last known location whether at home or away from home.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGS.

DETAILED DESCRIPTION OF THE INVENTION

Figure 1:
FIG. 1 is an input screen for registration of a person, pet, or object and the responsible adult or owner with the system.

As an initial preventative measure, a responsible adult or pet owner may purchases an ID tag which contains a unique identifying code. Such ID tags would be available at Doctor's offices, pharmacies, animal shelters, humane societies, veterinarians, pet stores, and the like. Then, the pet owner or person's responsible adult registers the person or pet, either online via the global computer network, or by mail, including various identifying information regarding both the person or pet and the responsible adult or owner. A photo of the person or pet can be included either by mail or it may be scanned so as to be in a digital format and then forwarded via the global computer network. The system's web site is structured to provide a registration process and a person or pet search engine interface. The information is stored within the system server in a computer retrievable format.

The process of the instant invention provides an automated method for coordinating a notification procedure for aid in locating a lost person or pet via the global computer network comprising the steps of providing a means for submission of the identifying data for registration of a particular person or pet; storing said identifying data in a computer retrievable format accessible via the global computer network; developing a database inclusive of public and private institutions and individuals selected to receive notification of lost persons or pets via the global computer network; maintaining said database in a computer retrievable format for access via the global computer network; providing a means for global computer network receipt of notification of loss of a registered person or pet, the area lost, and critical data pertinent thereto; activating an algorithm designed to compute, from said area lost and said critical pertinent data, a geographical area within which the lost person or pet is projected to have the highest probability of being resident; and providing a mechanism for distribution of an electronic mail alert notification to all of said public and private institutions and individuals within the computed area.

The invention further provides a lost person or pet notification computer for creation of individual notification of lost persons or pets to be transferred via the global computer network, comprising: an information submission module executable at said notification computer, said information submission module configured for submission of information relating to a particular person or pet, characterized by identification of said person or pet, the area lost, and specific information relating to the loss thereof; and an automated e-mail distribution module configured to select and distribute e-mail notifications regarding said lost pet to public and private institutions and individuals calculated to be resident within a geographical location projected to have the highest probability of containing the lost person or pet. In a particularly preferred embodiment, the system further includes an advertising module executable at an advertisement provider computer, said advertising module configured to select advertisement content from a database of advertisers located within the geographical location projected by said distribution module, and further configured to provide said advertisement in conjunction with said e-mail notification.

Now with reference to the accompanying figures, FIG. 1 shows an input screen for entering basic registration information regarding a person or pet and the responsible adult or owner.

Figure 2:
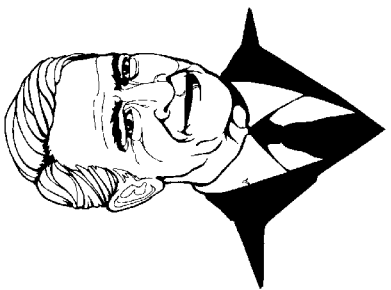
FIG. 2 is an input screen for notification of the system regarding the disappearance of a person, pet, or object.

Now referring to FIG. 2, an input screen for notification of the system regarding the disappearance of a person or pet is shown. Upon determining that a person or pet is missing, regardless if at home or away form home, the responsible adult or owner utilizes a computer or telephone to contact the system with pertinent information relating to the person or pet, the area lost, and its disappearance. It is possible for the responsible adult or owner to include their name, most current address, most current telephone number, e-mail address, and a personal message. It is also possible to include information about the person or pet including a description, name, height, weight, and other identifying data.

Figure 3:
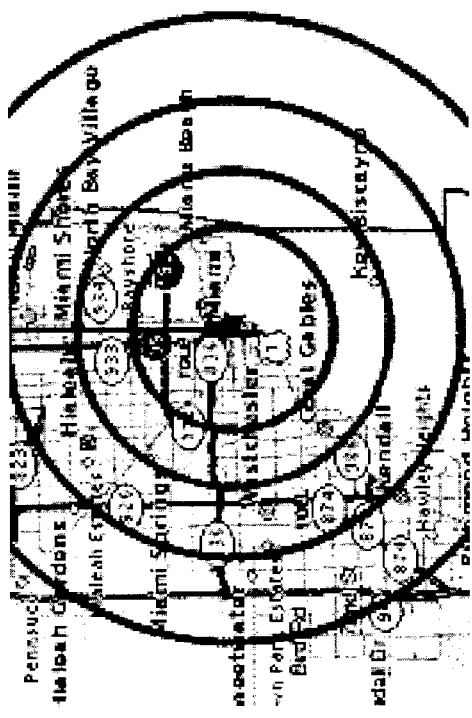
FIG. 3 is a system generated response which alerts the missing person, pet, or object's responsible adult or owner as to the calculated search area.

As next shown in FIG. 3, based upon the above data, the system can utilize an algorithm designed to calculate the geographical area deemed to have the highest probability of finding the person or pet. A map of the area is generated for the responsible adult or owner, along with instructions as to how to proceed after a given amount of time.

Figure 4:
FIG. 4 is a real-time screen which illustrates distribution of the alert through the system.
Figure 4:
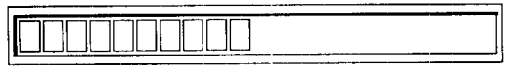
Figure 4:
Figure 4:
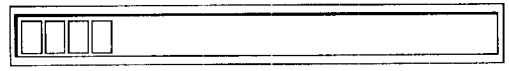
Figure 4:
Figure 4:
Figure 4:
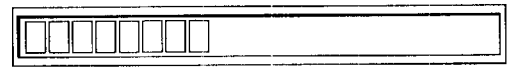
Figure 4:

Referring to FIG. 4, shown is a real-time screen which illustrates distribution of the alert through the system and its broadcast to the owner via the global computer network. This allows the owner to visualize the progress of the system in distributing the notification of their charge's or pet's disappearance.

Figure 5:
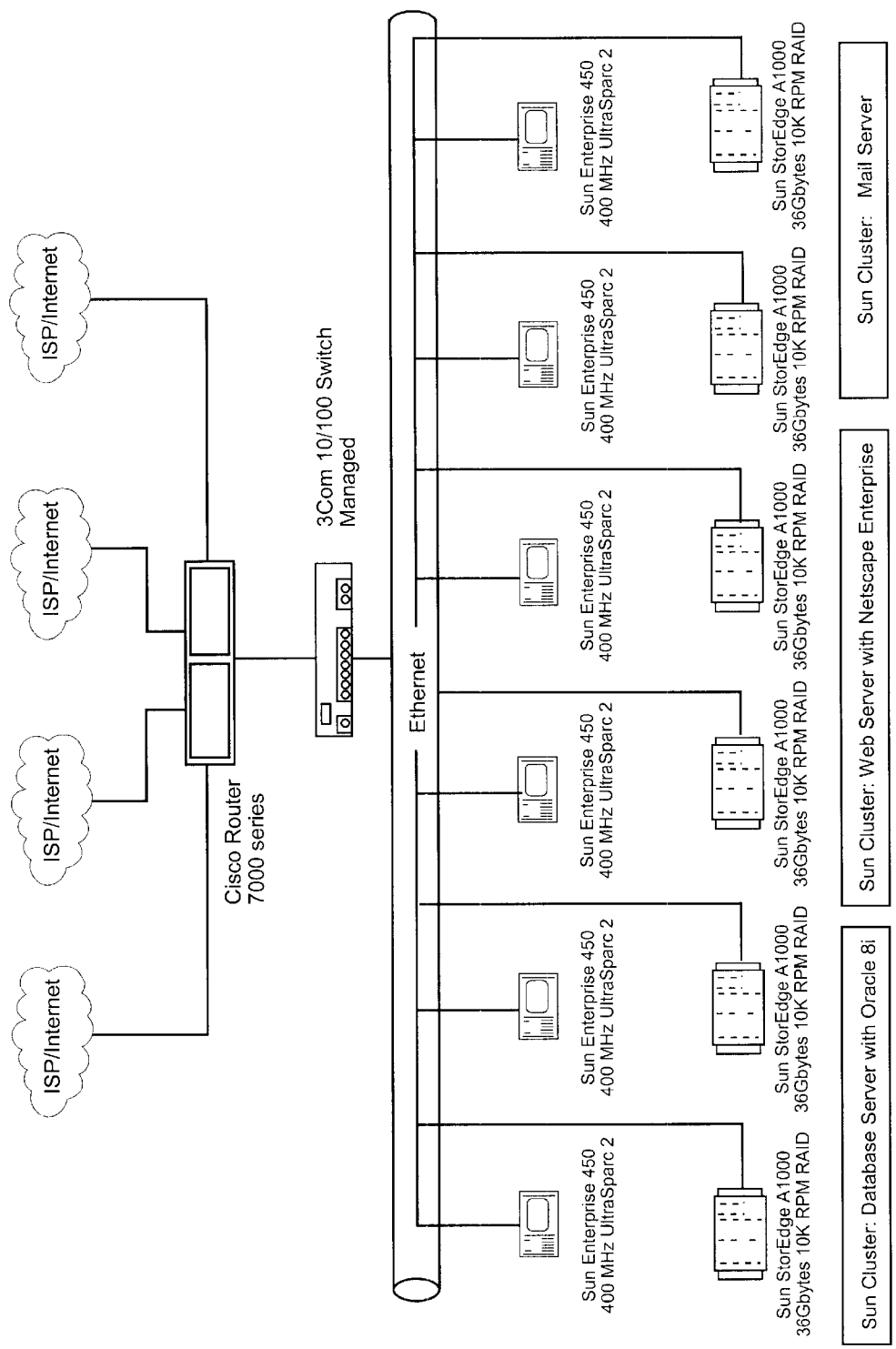
FIG. 5 is an example of the system architecture.

With reference to FIG. 5, shown is a diagram exemplifying the system architecture. The notification system will be divided into four main parts; (1) processing/database system, (2) messaging system, (3) web sever, and (4) network/telecom infrastructure.

The database server will rely on two SUN ENTERPRISE 450 servers or equilalents configured to operate as a cluster. ORACLE SERVER EE 8i, coupled with ORACLE PARALLEL SERVER or equivalents will optimize the SUN cluster architecture to provide an optimum database system. Data processing will be handled by ORACLE APPLICATION SERVER ENTERPRISE and ORACLE INTERMEDIA or equivalents.

The messaging system will be based upon a cluster architecture also and will utilize at least two SUN ENTERPRISE 2 Model 1400 servers to support SUN'S SENDMAIL messaging server.

Using the same physical architecture as the messaging system, the web server will implement NETSCAPE ENTERPRISE SERVER.

The network/telecom will utilize a device having the capabilities of a CISCO7500 Series router, particularly preferred is a CISCO 7576. Desirable characteristics are LAN-WAN services support, redundancy, reliability, and performance. Scalability is accomplished due to a bandwidth extensible to 4 Gbps. Switching is accomplished via a 3COM SUPERSTACK II Switch 3300 or equivalent.

It is to be understood that the area in which the person, pet, or article is lost is not limited to the area around the home but can be anywhere.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method for coordinating a notification procedure for aiding in the locating of a lost person while traveling comprising:
   providing a means for submission of identifying data for registration of a person;
   storing said identifying data in a computer retrievable format accessible via the global computer network;
   developing a database inclusive of public and private institutions and individuals selected to receive notification of lost persons via the global computer network;
   maintaining said database in a computer retrievable format for access via the global computer network;
   providing a means for global computer network receipt of notification of loss of a registered person, area lost, and other critical data pertinent thereto;
   activating an algorithm designed to compute, based upon said area lost and from said critical pertinent data, a geographical area within which the lost person is projected to have the highest probability of being resident; and
   providing a mechanism for distribution of an electronic mail alert notification to all of said public and private institutions and individuals within the computed area.

2. The method of claim 1 wherein the critical pertinent data includes the lost person's name, age, weight, hair color, eye color, national origin, and period of time that the person has been known to be missing.

3. The method of claim 1 wherein the means for submission is a questionnaire adapted to be completed via the global computer network.

4. The method of claim 1 wherein the method further includes obtaining and attaching a unique identifying tag to the person.

5. A missing person notification computer for creation of individualized notification of missing persons to be transferred via the global computer network, comprising;
   an information submission module executable at said notification computer, said information submission module configured for submission of information relating to a particular person, characterized by identification of said person, area lost, and specific information relating to the loss thereof; and
   an automated e-mail distribution module executable at said notification computer, said e-mail distribution module configured to select and distribute e-mail notifications regarding said missing person to public and private institutions and individuals calculated to be resident within a geographical location projected to have the highest probability of containing the missing person.

6. The missing person notification computer in accordance with claim 5, wherein said computer is associated with a website which is comprised of a plurality of computers.

7. The missing person notification computer in accordance with claim 5, further including;
   an advertising module executable at an advertisement provider computer, said advertising module configured to select advertisement content from a database of advertisers located within the geographical location projected by said distribution module, and further configured to provide said advertisement in conjunction with said e-mail notifications.

* * * * *